United States Patent
Hertwig et al.

(10) Patent No.: US 12,415,617 B2
(45) Date of Patent: Sep. 16, 2025

(54) FLIGHT CONDITION DETERMINATION DEVICE AND METHOD FOR DETERMINING A FLIGHT CONDITION OF AN AIRCRAFT

(71) Applicant: Airbus Operations GmbH, Hamburg (DE)

(72) Inventors: Christian Hertwig, Hamburg (DE); Klaus Von Hammel, Hamburg (DE); Christian Wiese, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 267 days.

(21) Appl. No.: 17/720,372

(22) Filed: Apr. 14, 2022

(65) Prior Publication Data
US 2022/0332433 A1 Oct. 20, 2022

(30) Foreign Application Priority Data
Apr. 16, 2021 (DE) .......... 102021109700.2

(51) Int. Cl.
*B64D 45/00* (2006.01)
*G01P 13/02* (2006.01)

(52) U.S. Cl.
CPC .......... *B64D 45/00* (2013.01); *G01P 13/025* (2013.01); *B64D 2045/008* (2013.01); *B64D 2045/0085* (2013.01)

(58) Field of Classification Search
CPC .............. B64D 45/00; B64D 2045/008; B64D 2045/0085; G01P 13/025
(Continued)

(56) References Cited

U.S. PATENT DOCUMENTS 10,919,617 B2 2/2021 Griffin et al.
2007/0026850 A1* 2/2007 Keohane ............ H04M 1/6075
455/418
(Continued)

FOREIGN PATENT DOCUMENTS

DE 102007058102 A1 * 7/2009 ............... G01L 5/00
EP 2990328 B1 3/2016
(Continued)

OTHER PUBLICATIONS

Introduction to ICP Accelerometers, 2020, PCB Piezotronics (Year: 2020).*
(Continued)

*Primary Examiner* — Matthias S Weisfeld
(74) *Attorney, Agent, or Firm* — Greer, Burns & Crain, Ltd.

(57) ABSTRACT

A flight condition determination device, in particular for autonomous use in an aircraft without connection to avionics systems, includes a housing, a triaxial acceleration sensor installed in the housing, a processor, which is coupled to the triaxial acceleration sensor and installed in the housing, a working memory coupled to the processor, and a power supply unit integrated in the housing, having a power supply socket, via which the flight condition determination device is connectable to an electrical energy supply source of an aircraft. The processor is configured to evaluate acceleration values continuously received from the triaxial acceleration sensor and to determine a flight condition signal from the evaluated acceleration values.

16 Claims, 2 Drawing Sheets

(58) Field of Classification Search
USPC .............................................................. 701/1
See application file for complete search history.

(56) References Cited

U.S. PATENT DOCUMENTS

| | | | |
|---|---|---|---|
| 2010/0318294 A1* | 12/2010 | Rosing | G01C 22/00 |
| | | | 701/500 |
| 2013/0185018 A1 | 7/2013 | Sheng | |
| 2015/0027226 A1* | 1/2015 | Turon | H04Q 9/00 |
| | | | 73/504.04 |
| 2016/0059968 A1 | 3/2016 | Bredemeier et al. | |
| 2016/0272341 A1 | 9/2016 | Van Horn et al. | |
| 2019/0061942 A1* | 2/2019 | Miller | G08G 5/55 |

FOREIGN PATENT DOCUMENTS

| | | |
|---|---|---|
| KR | 101916913 B1 | 1/2019 |
| WO | 2012044964 A2 | 4/2012 |
| WO | 2018075903 A2 | 4/2018 |

OTHER PUBLICATIONS

Iqbal, A Model-Based Testing Approach for Cockpit Display Systems of Avionics, Sep. 2019, ResearchGate (Year: 2019).*
Introduction of ICP Accelerometers, 2020, PCB Piezotronics (Year: 2020).*
Aircraft flight dynamics, Jan. 17, 2023, Wikipedia (Year: 2023).*
German Search Report; priority document.

* cited by examiner

FLIGHT CONDITION DETERMINATION DEVICE AND METHOD FOR DETERMINING A FLIGHT CONDITION OF AN AIRCRAFT

CROSS-REFERENCES TO RELATED APPLICATIONS

This application claims the benefit of the German patent application No. 102021109700.2 filed on Apr. 16, 2021, the entire disclosures of which are incorporated herein by way of reference.

FIELD OF THE INVENTION

The invention relates to a flight condition determination device, in particular for autonomous use in an aircraft without connection to avionics systems, and a method for autonomously determining a flight condition of an aircraft.

BACKGROUND OF THE INVENTION

For the functionality of diverse components onboard an aircraft, it is important to know the operating condition of the aircraft. In particular, it is advantageous to be able to distinguish automatically between the condition during flight and the condition on the ground of an aircraft.

Document EP 2 990 328 B1 describes a method in which the cabin pressure is used as a feature to distinguish between various flight conditions of an aircraft. However, the pressure application to an aircraft fuselage is not reliable enough under all circumstances for flight condition status determination, for example, in cases in which the ambient pressure is too low, for example in airports at high altitude above sea level.

Presently, items of information are generated in aircraft by the jet engines and/or the landing gear of the aircraft and distributed via an avionics data bus to components in the aircraft cabin controlled in dependence on the flight condition. In particular, in the case of retrofits of aircraft, it can be difficult to obtain access to the avionics data bus, since extensive wiring or refitting would be necessary.

Document KR 10-1916913 B1 discloses a method for determining the flight condition of an aircraft in the flight logistics branch with the aid of a mobile locating device attached to a container. Document US 2015/0027226 A1 discloses a system for determining a flight condition of an aircraft using an acceleration meter and a rotation rate meter.

SUMMARY OF THE INVENTION

One of the objects of the invention is therefore to specify a system which can independently and reliably distinguish between various flight conditions onboard an aircraft, without being dependent on additional items of information from external systems.

According to a first aspect of the invention, a flight condition determination device, in particular for autonomous use in an aircraft without connection to avionics systems, comprises a housing, a triaxial acceleration sensor installed in the housing, a processor, which is coupled to the triaxial acceleration sensor and installed in the housing, a working memory coupled to the processor, and a power supply unit integrated in the housing, having a power supply socket, via which the flight condition determination device is connectable to an electrical energy supply source of an aircraft. The processor is designed to evaluate acceleration values continuously received from the triaxial acceleration sensor and to determine a flight condition signal from the evaluated acceleration values.

According to a second aspect of the invention, a method for determining a flight condition of an aircraft comprises the steps of supplying a triaxial acceleration sensor installed in a housing of a flight condition determination device, a processor coupled to the triaxial acceleration sensor, and a working memory coupled to the processor with electrical energy of an energy supply source of the aircraft, continuously measuring acceleration values of the flight condition determination device by way of the triaxial acceleration sensor, feeding the acceleration values measured by the triaxial acceleration sensor into a state machine of the processor, and determining a flight condition signal reflecting the instantaneous condition of the state machine by way of the processor.

One of the essential concepts of the invention is to provide a flight condition determination device which can determine the flight condition of an aircraft automatically and promptly, for example, on the ground or in the air. The flight condition determination device does not have to be connected to external components, such as an avionics bus, for this purpose, but rather can determine the flight condition status independently using separate onboard means. Retrofit solutions, the functionality of which is dependent on the flight condition status, can therefore be implemented without complex installation and wiring expenditure and without the necessity for further changes to the remaining components of the aircraft in a simple and cost-effective manner in an aircraft.

One special advantage of the solution according to the invention results from the fact that autonomous devices, which have to be activated differently depending on the flight condition of the aircraft (in-flight; on the ground; just landed; taking off, etc.), can determine items of information about the flight condition promptly and reliably even without connection to existing avionics systems of the aircraft. Furthermore, the boundary conditions required for the flight condition determination can be preconfigured on the basis of previously simulated flight movements to ensure optimum reliability and reproducibility of the condition signals. In addition, the flight condition determination device can independently determine an orientation in space, so that installation positions having greater installation tolerances are possible, without impairing the functionality of the flight condition determination device.

In addition, the flight condition determination device can be supplied with electrical energy from the energy supply networks of the aircraft. Due to the specific initialization processes and the robust configuration of the condition determination, the flight condition determination device can be put back into a functional state rapidly and reliably at any time even in the event of unpredicted failures or temporary restrictions in the energy supply, without external restarts or initialization processes being necessary.

According to some embodiments of the flight condition determination device, the flight condition determination device can moreover have an output interface, via which the processor can output the determined flight condition signal.

According to some further embodiments of the flight condition determination device, the flight condition determination device can moreover have a nonvolatile memory coupled to the processor, in which preconfigured threshold values are stored, with the aid of which the processor can evaluate the acceleration values continuously received from the triaxial acceleration sensor. The processor, the working memory, and the nonvolatile memory can be integrated in a microcontroller in some embodiment variants.

According to some further embodiments of the flight condition determination device and the method, the processor can be designed to carry out the determination of the flight condition signal only from the evaluated acceleration values and autonomously from items of information of an avionics bus of the aircraft. This is advantageous, in particular, for retrofit solutions in which subsequent wiring with existing data networks of an aircraft is complex and costly.

According to some further embodiments of the flight condition determination device, the triaxial acceleration sensor can be a piezoelectric acceleration sensor, an electromagnetic induction sensor, or an acceleration sensor based on microelectromechanical systems. Such sensors can be miniaturized and are inexpensive to acquire.

According to some further embodiments of the flight condition determination device, the processor can implement a state machine, which has the following flight conditions: on the ground, in the air, landing, and liftoff.

According to some further embodiments of the flight condition determination device, the processor can furthermore be designed, upon beginning electrical energy supply by the power supply unit, to determine the orientation of the flight condition determination device in dependence on the variable influence of the Earth's gravity on the acceleration values continuously received from the triaxial acceleration sensor.

According to some further embodiments of the flight condition determination device, the processor can furthermore be designed to calculate the instantaneous acceleration of the aircraft along the aircraft longitudinal axis, the mean instantaneous lateral velocity along the horizontal perpendicular to the aircraft longitudinal axis, and the mean instantaneous vertical velocity perpendicular to the horizontal and perpendicular to the aircraft longitudinal axis from the acceleration values continuously received from the triaxial acceleration sensor.

The above embodiments and refinements may be combined with one another arbitrarily, if reasonable. Further possible embodiments, refinements, and implementations of the invention comprise combinations of features of the invention which were described above or are described hereinafter with respect to the exemplary embodiments, even if not explicitly mentioned. In particular, a person skilled in the art will also add individual aspects as improvements or additions to the particular basic form of the present invention.

BRIEF DESCRIPTION OF THE DRAWINGS

The present invention is explained in more detail hereinafter on the basis of the exemplary embodiments indicated in the schematic figures. In the figures.

Figure 1:
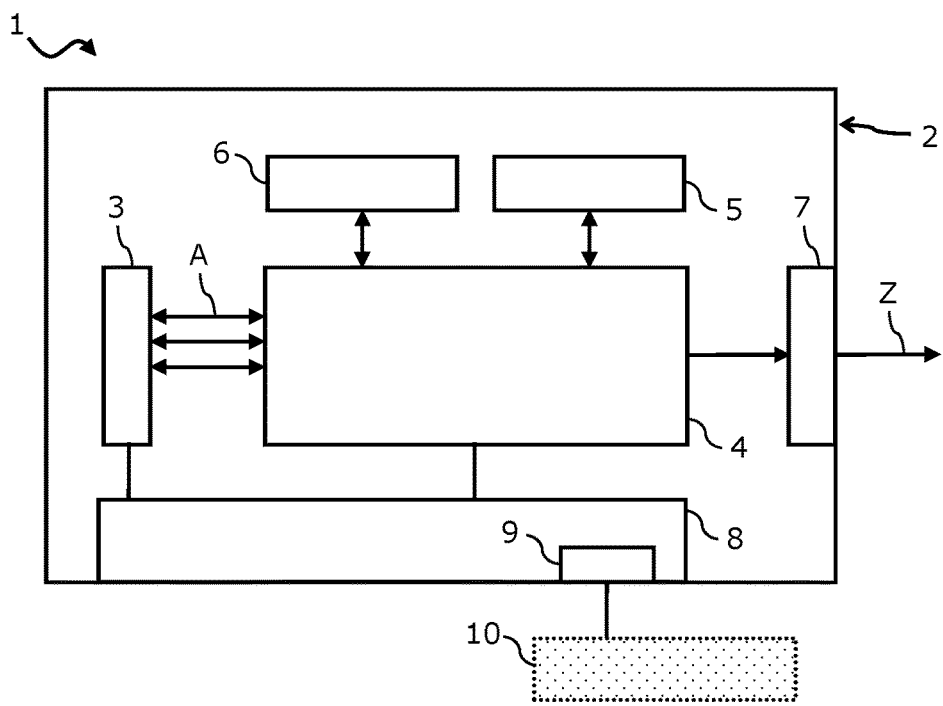
FIG. 1 shows an exemplary block diagram of the structure of a flight condition determination device according to one embodiment of the invention.

The appended figures are to provide further comprehension of the embodiments of the invention. They illustrate embodiments and are used in conjunction with the description to explain principles and concepts of the invention. Other embodiments and many of the mentioned advantages result with respect to the drawings. Elements of the drawings are not necessarily shown in scale to one another. Direction specifying terminology such as "upper", "lower", "left", "right", "above", "below", "horizontal", "vertical", "front", "rear", and similar specifications are used solely for explanatory purposes and are not used to restrict the generality to specific embodiments as shown in the figures.

In the figures of the drawing, identical, functionally identical, and identically acting elements, features, and components—if not indicated otherwise—are each provided with the same reference signs.

DETAILED DESCRIPTION OF THE PREFERRED EMBODIMENTS

FIG. 1 shows an exemplary block diagram of the structure of a flight condition determination device 1. The flight condition determination device 1 contains a housing 2, in which a triaxial acceleration sensor 3, a processor 4 coupled to the triaxial acceleration sensor 3, a nonvolatile memory 5 coupled to the processor 4, a (volatile) working memory 6 coupled to the processor 4, such as a random access memory (RAM), and an output interface 7 coupled to the processor 4 are housed. The processor 4, the nonvolatile memory 5, the working memory 6, and possibly further peripheral components (not explicitly shown), such as clock generators, interrupt controllers, network communication modules, or watchdog circuits can be integrated, for example, in a microcontroller chip. Instead of a microcontroller, for example, a microprocessor, an application-specific integrated circuit (ASIC), a field-programmable logic gate array (FPGA), a programmable logic device (PLD), or another miniaturized electronic computing device can also be used.

The flight condition determination device 1 furthermore has a power supply unit 8, which is integrated in the housing 2, and which can be coupled via a power supply socket 9 to an external electrical energy supply source 10. For example, the flight condition determination device 1 can be connected via wiring between the power supply socket 9 and an electrical supply network as the energy supply source 10. Upon use in an aircraft, the flight condition determination device 1 can be connected, for example, to a 28 V DC voltage network.

In particular, it is possible that the flight condition determination device 1 can be installed as a retrofit module in an existing aircraft. It can be possible to connect the flight condition determination device 1 via the power supply socket 9 to the existing energy supply network 10 of the aircraft and supply it with energy via the central power supply of the aircraft. However, it is not necessary to connect the flight condition determination device 1 to further networks of the aircraft, such as data networks or an avionics bus. For example, the flight condition determination device 1 can be installed in an aircraft door of an aircraft and can be connected to the power supply of the aircraft, via which the remaining electronics and electrical systems of the aircraft door are also supplied with electrical energy.

The housing 2 can have fastening points or fastening devices, via which the flight condition determination device 1 can be fastened on an external component, for example an element in an aircraft, for example in a cargo space, in a passenger cabin, in a galley, in a cockpit, in the landing gear of an aircraft, or in an aircraft door.

The triaxial acceleration sensor 3 can be, for example, a piezoelectric acceleration sensor, an electromagnetic induction sensor, an acceleration sensor based on microelectromechanical systems (MEMS sensor), or any other type of acceleration sensor. In particular, the triaxial acceleration sensor 3 is configured to output three-dimensionally resolved, mutually independent, and digital or analog acceleration values A in a time-resolved manner and in a predeterminable update cycle (for example at a readout frequency of 100 Hz) to the processor 4.

The processor 4 continually evaluates the acceleration values A continuously received from the triaxial acceleration sensor 3 and generates a condition signal Z therefrom, which can be output via the output interface 7 on display means of the flight condition determination device 1 or other external electronic systems. For example, the flight condition determination device 1 can be installed in an aircraft door and can be coupled to electronic control devices for components of the aircraft door, such as an automatic lock or an emergency slide trigger system. Depending on the condition signals Z received from the flight condition determination device 1, the electronic control devices can then deliberately activate or block various functions of the controlled system or warn a user of activation or deactivation of certain functions. For example, an electronic control device of an emergency slide trigger system can use condition signals Z received from the flight condition determination device 1 as warning indexes if an attempt is made to open the aircraft door although the emergency slides are still switched to active, for example, because a deactivation has inadvertently not taken place or a deactivation has technically failed. In particular, the flight condition determination device 1 can be used as a warning device during flight instead of or in addition to other warning devices.

The triaxial acceleration sensor 3 and the processor 4 are in mutual communication. The processor 4 analyzes the measured values received from the triaxial acceleration sensor 3 according to various, periodically iterated processing steps:
- preprocessing, inter alia with noise reduction of the measurement data, offset correction, and/or three-dimensional angle transformation to take into consideration differing installation locations;
- temporarily storing preprocessed acceleration measured values;
- monitoring condition transitions of a state machine implemented in the processor 4 on the basis of comparisons of the instantaneous and/or earlier acceleration measured values to preconfigured requirement threshold values;
- validating the determined present conditions of the state machine with the aid of additional acceleration measured values; and
- progressively outputting condition signals to external signal pickups on the basis of the present conditions of the state machine.

The functionality of the flight condition determination device 1 is explained in more detail hereinafter in conjunction with the flow charts of FIGS. 2 and 3 and the condition transition diagram of FIG. 4. The flight condition determination device 1 can be used in a method for determining the flight condition of an aircraft, as explained by way of example in conjunction with FIG. 5.

Figure 2:
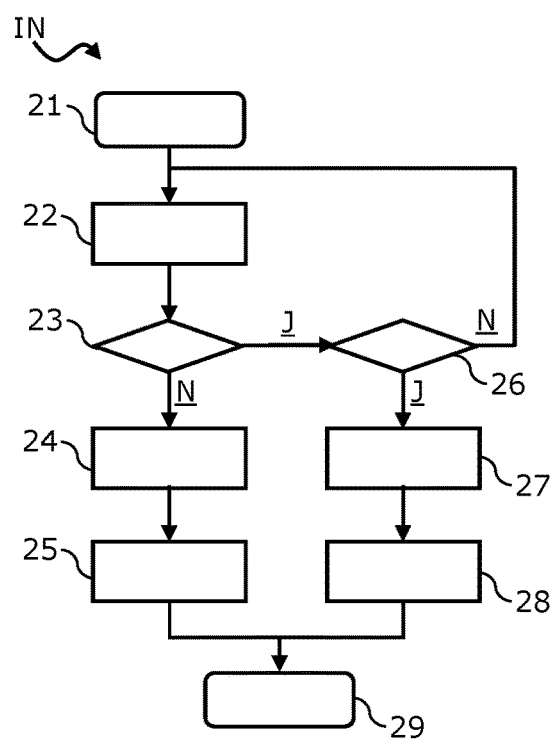
FIG. 2 shows a flow chart of an exemplary initialization process of a flight condition determination device according to a further embodiment of the invention.

FIG. 2 shows a flow chart of an initialization phase IN of a processor 4 of the flight condition determination device 1 from FIG. 1. After an activation 21 of the flight condition determination device 1, for example, upon beginning electrical energy supply by the power supply unit 8, in a step 22, firstly the orientation of the flight condition determination device 1 is determined. In this case, three-dimensionally resolved acceleration values of the acceleration sensor 3 are averaged in the processor 4 over a predetermined initialization time period, for example over five seconds. From the averaged values, three-dimensional orientation angles of the flight condition determination device 1 can be determined, in dependence on the variable influence of the Earth's gravity on the three acceleration values.

In step 23, it is checked whether high-frequency oscillations occurred during the readout of the acceleration values, which indicate a vibration of the acceleration sensor 3. For example, it can occur that in the event of the power supply being interrupted during a flight, the flight condition determination device 1 is restarted or initialized when the aircraft is in the air. In this case, increased vibrations can occur due to the flight operation, which make a reliable orientation angle determination very difficult. When such vibrations have occurred, in a step 26, the readout of acceleration values can be repeated a predetermined number of times, for example, five times.

If it has been possible during one of these repetitions to obtain vibration-free acceleration values, in step 24 and 25, the determined three-dimensional orientation angles are written in the nonvolatile memory 5 or the working memory 6. Otherwise, i.e., after the predetermined number of iterations without reliable acceleration value acquisition, in step 27, the last set of stored three-dimensional orientation angles is read out from the nonvolatile memory 5 and written in the working memory 6 in step 28. In any case, the initialization phase ends in a step 29 with a set of three-dimensional orientation angles in the working memory 6.

In this way, it can be ensured that the flight condition determination device 1 in any case has a reference normalization of the acceleration values measured by the acceleration sensor 3, even if the flight condition determination device 1 has to be restarted in an unplanned manner, for example, due to a temporary interruption in the power supply. This is an advantage over other flight condition sensors autonomously supplied with electrical energy by way of batteries or photovoltaic modules.

Figure 3:
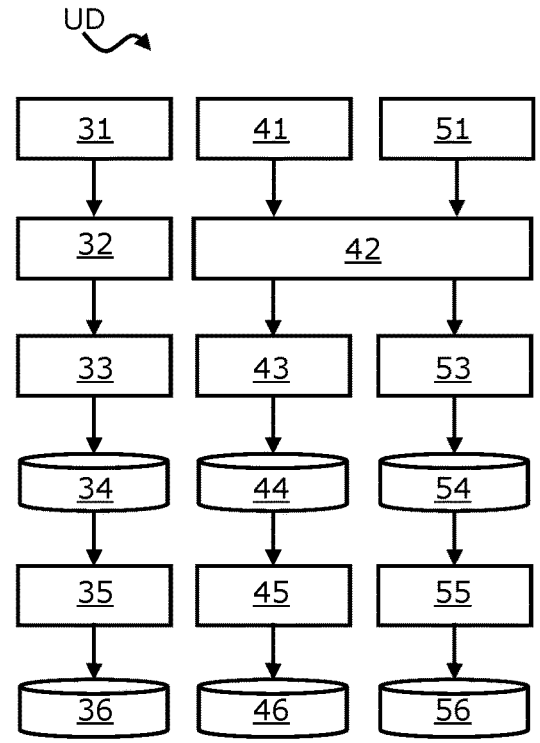
FIG. 3 shows a flow chart of an exemplary movement parameter calculation process of a flight condition determination device according to a further embodiment of the invention.

FIG. 3 shows a flow chart for a periodic and progressive update UD of movement parameters of the flight condition determination device 1, which is carried out in the processor 4 on the basis of the acceleration values A measured by the acceleration sensor 3.

After initial noise reduction of all measured acceleration values A, for example, via sliding averaging and/or via low-pass filtering in steps 31 (x acceleration along the aircraft longitudinal axis), 41 (y acceleration perpendicular to the aircraft longitudinal axis along the horizontal), and 51 (z acceleration perpendicular to the aircraft longitudinal axis along the direction of the Earth's gravity), the y acceleration and the z acceleration are first rotated in step 42 via an affine transformation around the flight direction axis or aircraft longitudinal axis. For this purpose, the stored set of three-dimensional orientation angles from the working memory 6 can be used.

Then, an offset correction is carried out in steps 32, 43, and 53 for the respective x, y, and z acceleration values, for example, via a differentiator/integrator. Via the offset correction, for example, drifts caused by temperature variations in the low-frequency baseline can be equalized. For the x acceleration values, in step 33 an integration or summation with error correction is performed for the integration step, to obtain an estimation for the velocity component in the direction of the aircraft longitudinal axis, i.e., for the velocity of the aircraft. These estimated values are saved in the working memory 6 in step 34, preferably in a queue buffer, i.e., the last saved estimated values are successively deposited in storage spaces following the previously saved estimated values. Averaging over the estimated values of a predetermined time window can be carried out via the queue buffer.

In a similar manner, the y acceleration values and z acceleration values can be stored in steps 44 and 54, respectively, in further queue buffers of the working memory 6. In steps 35, 45, and 55, averaged estimated values can then be inferred for the various queue buffers, to calculate the instantaneous acceleration ax of the aircraft along the aircraft longitudinal axis, the average instantaneous lateral velocity vy along the horizontal perpendicular to the aircraft longitudinal axis, and the mean instantaneous vertical velocity vz perpendicular to the horizontal and perpendicular to the aircraft longitudinal axis. Different time spans for the variable calculation can be used for each of steps 35, 45, and 55. For example, the time span for the calculation of the instantaneous acceleration ax of the aircraft along the aircraft longitudinal axis can be selected so that the typical duration for an aircraft takeoff is adequately depicted. As a further example, the time span for the calculation of the average instantaneous vertical velocity vz perpendicular to the horizontal can be selected so that typical durations for the upward and downward movement of the aircraft in turbulence are adequately depicted.

The variables ax, vy, and vz thus calculated can be written in the working memory 6 in steps 36, 46, and 56, respectively. The update rate of the variables ax, vy, and vz in the working memory 6 can be, for example, between 0.2 and 3 Hz, in particular approximately 1 Hz.

Figure 4:
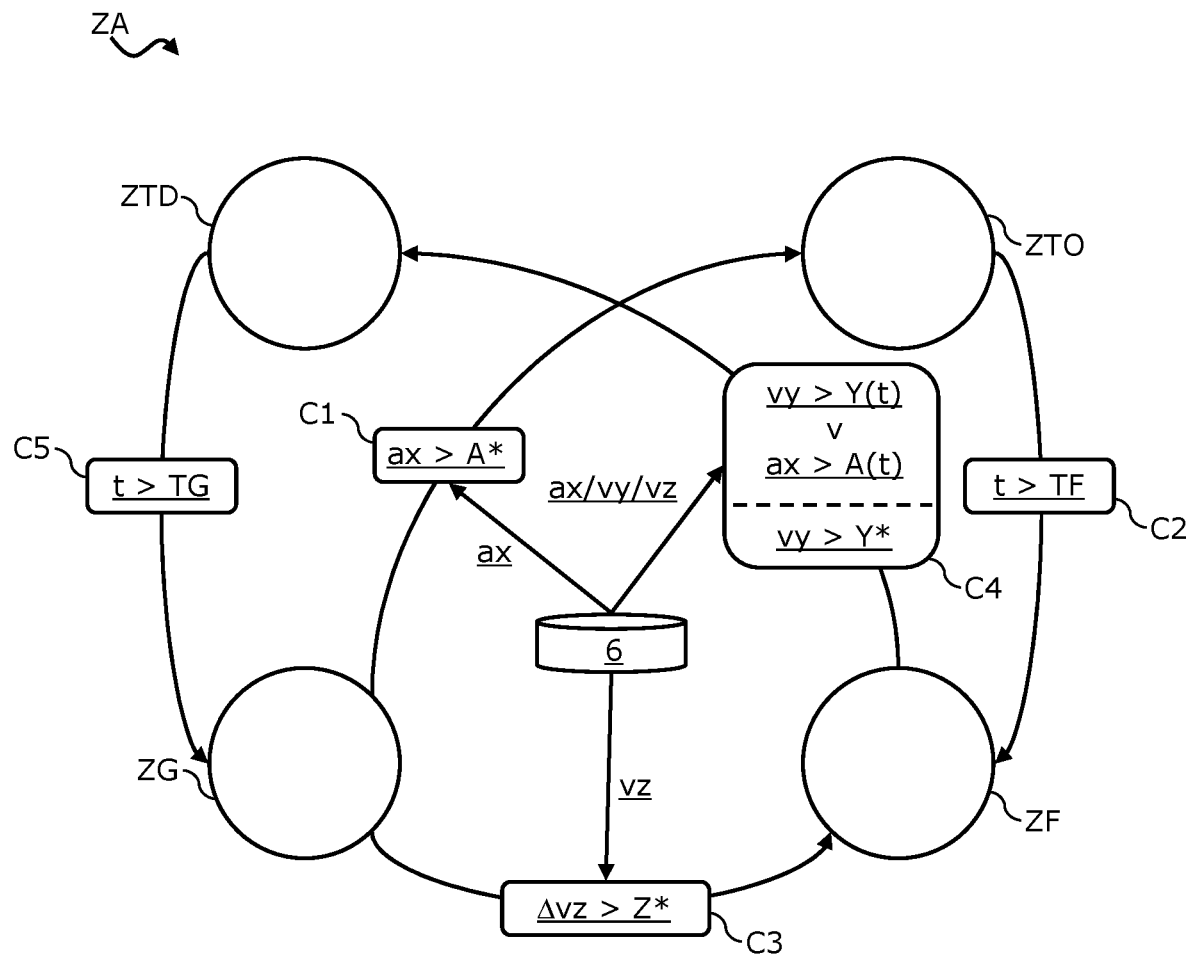
FIG. 4 shows a condition transition diagram for an exemplary flight condition determination using a flight condition determination device according to a further embodiment of the invention.

FIG. 4 illustrates an exemplary condition transition diagram of a state machine ZA, which can be implemented in a processor 4. The four conditions illustrated each depict possible flight conditions of the aircraft in which the flight condition determination device 1 is installed: The condition ZG of the aircraft on the ground, the condition ZF of the aircraft in flight, the condition ZTO of the aircraft during takeoff, and the condition ZTD of the aircraft during landing ("touchdown"). It is regularly possible to pass from the condition ZG into the condition ZF via the condition ZTO. In the context of the validation of the condition transitions, it can also be possible to pass as an exception from the condition ZG directly into the condition ZF. From the condition ZTO, it is only possible to pass into the condition ZF. From the condition ZF, a transition can take place into the condition ZTD, from which in turn only a transition into the condition ZG is possible.

The requirements for the condition transitions are identified by the reference signs C1, C2, C3, C4, and C5. Only the requirement checks C1, C3, and C4 in the processor 4 use dynamically changing variables ax, vy, and vz from the working memory 6. The transition checks C2 and C5 are solely time sequence-based transition checks, i.e., after a time span TF, after the condition ZTO has been assumed, the state machine ZA automatically changes to the condition ZF. Similarly, the state machine ZA automatically changes from the condition ZTD into the condition ZG when a time span TG after the condition ZTD has been assumed has passed. The time spans TF and TG can be preconfigured. The time spans TF and TG can be different or equal. In some examples, the time spans TF and TG can be between 5 seconds and 30 minutes. For example, the time span TG can be 10 seconds and the time span TF can be 10 minutes.

In the requirement C1, it is checked whether the aircraft, which is initially in the condition ZG on the ground, lifts off from the ground (and thus passes into the condition ZTO). For this purpose, the processor 4 checks whether the longitudinal acceleration ax exceeds a longitudinal acceleration threshold value A* over a predetermined time period. This check can use, for example, the present measured value ax from the working memory 6 and a preconfigured threshold value parameter A*. It can also be possible to sum the values of the longitudinal acceleration ax over a predefined past time period and compare them to a preconfigured threshold value parameter A*, which then corresponds to a summed threshold value from which it is presumed that a liftoff process of the aircraft has taken place.

As a security measure, it is moreover checked in the condition ZG whether a landing ZTD has incorrectly been determined, although the aircraft is still in the air. For this purpose, the deviation of the vertical velocity Δvz is compared to a vertical movement threshold value Z*. The deviation of the vertical velocity Δvz can be formed here as the difference between the maximum value of the vertical velocity and the minimum value of the vertical velocity over a defined time span in the past. If this deviation of the vertical velocity Δvz should be above the vertical movement threshold value Z* in a predetermined checking time period, it is possible to return from the condition ZG via the requirement C3 back into the flight condition ZF.

Via a multifactorial requirement C4, it is possible to change from the flight condition ZF into the condition ZTD of a landing when one of two requirements is met: Either both the lateral velocity vy and the longitudinal acceleration ax each exceed time-dependent threshold values Y(t) and A(t) over a predetermined time period, or the lateral velocity vy exceeds a defined lateral velocity highest threshold value Y* independently of time. The time-dependent threshold values Y(t) and A(t) can be preconfigured in discrete steps for time spans of different lengths having different values. In particular, time-dependent discrete threshold values Y(t) and A(t) can be preconfigured for three or more time spans of different lengths—this pre-configuration can be adapted to the aircraft type of the aircraft in which the flight condition determination device 1 is installed.

The preconfiguration of the various relevant time spans for the requirement check and the different threshold values TF, TG, A*, Y*, Z*, A(t), and Y(t) can be determined via an iterative parameter optimization based on a data lake simulation. For this purpose, initialization values can be selected for the different threshold values TF, TG, A*, Y*, Z*, A(t), and Y(t), which are used as the starting point of a simulation of a large number of flight movements. A search is then made for errors or inconsistencies in the condition transitions of the state machine ZA. After a plausibility check of the simulation data sets and possibly required filtering of the simulation data sets of data sets unusable due to the determined errors or inconsistencies, a targeted adaptation of one or more of the threshold values TF, TG, A*, Y*, Z*, A(t), and Y(t) can be performed. These adapted threshold values TF, TG, A*, Y*, Z*, A(t), and Y(t) are again used as the starting point for further simulations of flight movements.

When the check for errors or inconsistencies in the condition transitions of the state machine ZA returns the result that no more or essentially no more unusable data sets are being simulated, the adapted threshold values TF, TG, A*, Y*, Z*, A(t), and Y(t) used at this time can be released as a functional parameter set for use in the processor 4.

Figure 5:
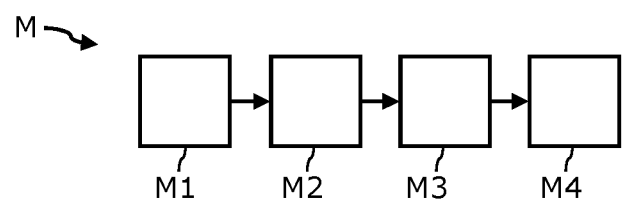
FIG. 5 shows a simplified flow chart for a method for determining a flight condition of an aircraft according to a further embodiment of the invention.

FIG. 5 shows a block diagram of a sequence of a method M for determining a flight condition of an aircraft. The method M can be carried out, for example, in a flight condition determination device 1, as explained and shown in conjunction with FIGS. 1 to 4.

In a first step M1, a supply of a triaxial acceleration sensor 3, a processor 4 coupled to the triaxial acceleration sensor 3, and a working memory 6, which is coupled to the processor 4, of a flight condition determination device with electrical energy of an energy supply source 10 of the aircraft takes place. The processor 4, the triaxial acceleration sensor 3, and the working memory are housed in a common housing.

In a step M2, acceleration values of the flight condition determination device 1 are continuously measured by the triaxial acceleration sensor 3, which are then fed in step M3 into a state machine ZA of the processor 4. Condition transitions of the state machine ZA are calculated from these measured acceleration values, so that in step M4, a flight condition signal Z reflecting the instantaneous condition of the state machine ZA can be determined by the processor 4.

The method M can in particular only be carried out as a function of the measured acceleration values A and autonomously from items of information of an avionics bus of the aircraft.

In the preceding detailed description, various features have been summarized in one or more examples to improve the stringency of the description. However, it should be clear that the above description is solely of an illustrative nature, but is in no way restrictive. It is used to cover all alternatives, modifications, and equivalents of the various features and exemplary embodiments. Many other examples will be immediately and directly clear to a person skilled in the art on the basis of their technical knowledge in consideration of the above description.

The exemplary embodiments were selected and described to be able to represent the underlying principles of the invention and its possible applications in practice in the best possible manner. Those skilled in the art can thus optimally modify and use the invention and its various exemplary embodiments with respect to the intended purpose. In the claims and the description, the terms "including" and "having" are used as neutral concepts for the corresponding term "comprising". Furthermore, use of the terms "a", "an", and "one" is not in principle intended to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight condition determination device, comprising:
a housing installed in, or fastened to, an element which is part of forms a portion of a structure of an aircraft;
a triaxial acceleration sensor installed in the housing, a processor coupled to the triaxial acceleration sensor and installed in the housing;
a working memory coupled to the processor;
a power supply unit integrated in the housing, having a power supply socket, via which the flight condition determination device is connected to an electrical energy supply source of the aircraft,
wherein the processor is configured to evaluate acceleration values continuously received from the triaxial acceleration sensor and to determine a flight condition signal of the aircraft from evaluated acceleration values, wherein the processor is configured to calculate an instantaneous acceleration of the aircraft along an aircraft longitudinal axis, a mean instantaneous lateral velocity horizontally perpendicular to the aircraft longitudinal axis, and a mean instantaneous vertical velocity perpendicular to the horizontal and perpendicular to the aircraft longitudinal axis from the acceleration values continuously received from the triaxial acceleration sensor, and wherein a time span for each of the calculations performed by the processor is based on a duration of a flight condition of the aircraft, and wherein the time span for the calculation of the mean instantaneous lateral velocity is different from the time span for the calculation of mean instantaneous vertical velocity; and
an output interface, via which the processor outputs the ascertained flight condition signal to an electronic control device of the aircraft, such that the electronic control device places the element in either an activated state which activates a function of the element or a deactivated state which blocks a function of the element based on the flight condition signal.

2. The flight condition determination device as claimed in claim 1, wherein the processor is configured to check whether high-frequency oscillations have occurred during a readout of the acceleration values from the triaxial acceleration sensor, and repeat the readout of the acceleration values a predetermined number of times when high-frequency oscillations have occurred.

3. The flight condition determination device as claimed in claim 1, wherein the processor is configured to conduct noise reduction of the received acceleration values by at least one of: sliding averaging and low-pass filtering.

4. The flight condition determination device as claimed in claim 1, furthermore having:
a nonvolatile memory coupled to the processor, in which preconfigured threshold values are stored, which aid the processor to evaluate the acceleration values continuously received from the triaxial acceleration sensor.

5. The flight condition determination device as claimed in claim 4, wherein the processor, the working memory, and the nonvolatile memory are integrated in a microcontroller.

6. The flight condition determination device as claimed in claim 1, wherein the processor is configured to carry out a determination of the flight condition signal only from evaluated acceleration values and autonomously from items of information of an avionics bus of the aircraft.

7. The flight condition determination device as claimed in claim 1, wherein the triaxial acceleration sensor is a piezoelectric acceleration sensor, an electromagnetic induction sensor, or an acceleration sensor based on microelectromechanical systems.

8. The flight condition determination device as claimed in claim 1, wherein the processor implements a state machine, which has flight conditions comprising: on the ground, in the air, landing, and liftoff.

9. The flight condition determination device as claimed in claim 1, wherein the processor is furthermore configured, upon beginning electrical energy supply by the power supply unit, to determine an orientation of the flight condition determination device in dependence on a variable influence of Earth's gravity on acceleration values continuously received from the triaxial acceleration sensor.

10. A method for determining a flight condition of an aircraft, comprising:
supplying a triaxial acceleration sensor installed in a housing of a flight condition determination device, a processor coupled to the triaxial acceleration sensor, a working memory coupled to the processor, an output interface, and a power supply unit integrated in the housing, having a power supply socket, via which the flight condition determination device is connected to an energy supply source of the aircraft, wherein the housing is installed in, or fastened to, the element which forms the portion of the structure of the aircraft;
continuously measuring acceleration values of the flight condition determination device by way of the triaxial acceleration sensor;
feeding the acceleration values measured by the triaxial acceleration sensor into a state machine of the processor;
determining a flight condition signal reflecting an instantaneous state of the state machine by way of the processor, wherein the processor is configured to calculate an instantaneous acceleration of the aircraft along an aircraft longitudinal axis, a mean instantaneous lateral velocity horizontally perpendicular to the aircraft longitudinal axis. and a mean instantaneous vertical velocity perpendicular to the horizontal and perpendicular to the aircraft longitudinal axis from the acceleration values continuously received from the triaxial acceleration sensor, and wherein a time span for each of the calculations performed by the processor is based on a duration of a flight condition of the aircraft, and wherein the time span for the calculation of the mean instantaneous lateral velocity is different from the time span for the calculation of mean instantaneous vertical velocity; and
outputting, via the output interface, the ascertained flight condition signal to an electronic control device of the aircraft, such that the electronic control device places the element in either an activated state which activates a function of the element or a deactivated state which blocks a function of the element based on the flight condition signal.

11. The method as claimed in claim 10, wherein the determination of the flight condition signal only takes place as a function of the measured acceleration values and autonomously from items of information of an avionics bus of the aircraft.

12. The method as claimed in claim 10, wherein the processor is configured to check whether high-frequency oscillations have occurred during a readout of the acceleration values from the triaxial acceleration sensor, and repeat the readout of the acceleration values a predetermined number of times when high-frequency oscillations have occurred.

13. The method as claimed in claim 10, wherein the processor is configured to conduct noise reduction of the measured acceleration values by at least one of: sliding averaging and low-pass filtering.

14. A flight condition determination device, comprising:
a housing installed in, or fastened to, an element which forms a portion of a structure of an aircraft;
a triaxial acceleration sensor installed in the housing, a processor coupled to the triaxial acceleration sensor and installed in the housing, wherein the processor implements a state machine, which has flight conditions comprising: on the ground, in the air, landing, and liftoff;
a working memory coupled to the processor;
a power supply unit integrated in the housing, having a power supply socket, via which the flight condition determination device is connected to an electrical energy supply source of the aircraft, wherein the processor is configured to evaluate acceleration values continuously received from the triaxial acceleration sensor and to determine a flight condition signal of the aircraft from evaluated acceleration values, such that the processor is configured to:
wherein the processor is configured to calculate an instantaneous acceleration of the aircraft along an aircraft longitudinal axis, a mean instantaneous lateral velocity horizontally perpendicular to the aircraft longitudinal axis, and a mean instantaneous vertical velocity perpendicular to the horizontal and perpendicular to the aircraft longitudinal axis from the acceleration values continuously received from the triaxial acceleration sensor, and wherein a time span for each of the calculations performed by the processor is based on a duration of a flight condition of the aircraft, and wherein the time span for the calculation of the mean instantaneous lateral velocity is different from the time span for the calculation of mean instantaneous vertical velocity;
carry out a determination of the flight condition signal only from evaluated acceleration values and autonomously from items of information of an avionics bus of the aircraft, and
validate the determined flight condition of the state machine with the aid of additional acceleration measured values; and
an output interface, via which the processor outputs the ascertained flight condition signal to an electronic control device of the aircraft, such that the electronic control device places the element in either an activated state which activates a function of the element or a deactivated state which blocks a function of the element based on the flight condition signal.

15. The flight condition determination device as claimed in claim 14, wherein the processor is configured to check whether high-frequency oscillations have occurred during a readout of the acceleration values from the triaxial acceleration sensor, and repeat the readout of the acceleration values a predetermined number of times when high-frequency oscillations have occurred.

16. The flight condition determination device as claimed in claim 14, wherein the processor is configured to conduct noise reduction of the received acceleration values by at least one of: sliding averaging and low-pass filtering.

* * * * *